Figure 1:
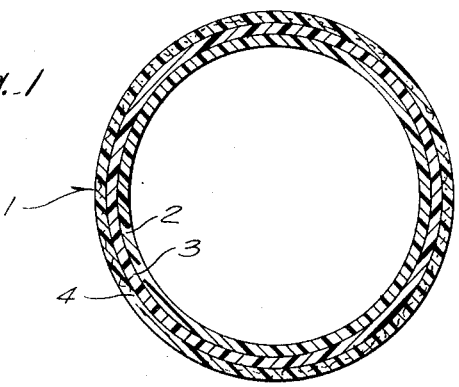

United States Patent
Johnson

[15] 3,652,375
[45] Mar. 28, 1972

[54] PLASTIC ARTICLE HAVING ULTRAVIOLET REFLECTIVE PROPERTIES

[72] Inventor: Junior L. Johnson, Mabelvale, Ark.
[73] Assignee: A. O. Smith-Inland, Milwaukee, Wis.
[22] Filed: Nov. 25, 1969
[21] Appl. No.: 879,834

[52] U.S. Cl............................161/158, 138/144, 161/93, 161/162, 161/168
[51] Int. Cl.................................................B32b 5/22
[58] Field of Search...................264/111, 112, 113, 110, 73, 264/255, 256, 271; 161/198, 162, 170, 93, 168, DIG. 2; 138/144, DIG. 2, DIG. 7

[56] References Cited

UNITED STATES PATENTS

| | | | |
|---|---|---|---|
| 2,168,366 | 8/1939 | Slayter | 138/DIG. 2 |
| 2,713,383 | 7/1955 | Kennedy | 138/DIG. 7 |
| 2,996,709 | 8/1961 | Pratt | 161/158 |
| 3,338,163 | 8/1967 | Maria et al. | 161/162 |
| 3,440,132 | 4/1969 | Koubek | 161/158 |

Primary Examiner—Houston S. Bell, Jr.
Attorney—Andrus, Sceales, Starke and Sawall

[57] ABSTRACT

A plastic pipe composed of thermosetting resin reinforced with glass fibers. The resin in the outer portion of the pipe contains fine mesh aluminum or other light reflective metallic powder to provide protection for the pipe against ultraviolet degradation.

4 Claims, 2 Drawing Figures

PATENTED MAR 28 1972  3,652,375

Inventor
Junior L. Johnson
By Andrus, Sceales, Starke & Sawall
Attorneys

3,652,375

PLASTIC ARTICLE HAVING ULTRAVIOLET REFLECTIVE PROPERTIES

BACKGROUND OF THE INVENTION

This invention relates to plastic articles and more particularly to thermosetting plastic tubular articles having glass reinforcement.

In industrial uses of plastic articles such as plastic pipe, it is common to employ glass reinforced resin compositions in the pipe walls. Vinyl ester, polyester, epoxy and other resins are used in fabricating the plastic pipe, and glass reinforcement in the form of helical wound fibers or strands, matting or woven fabric is incorporated in the pipe to provide the desired physical properties for industrial use.

Thermosetting resins such as vinyl ester, polyester, and epoxy tend to degrade when exposed to ultraviolet radiation. The molecules of the resin tend to break down due to the radiation energy and the resin will begin chalking on the surfaces of the plastic structure. The desirable physical and chemical properties of the resin may thus be impaired when the pipe is exposed to light for extended periods of time.

In glass reinforced resin structures the chalking of the resin will cause fiber bloom, meaning that the glass fibers will be exposed on the surface of the structure. The surfaces exposed to the radiation are affected first, but under higher temperatures or prolonged exposure to the radiation, inner surfaces also experience fiber bloom. The fiber exposure impairs the desired physical characteristics of the plastic article, including the original smoothness on its surfaces. In piping systems the inner diameter of the plastic pipe can become roughened by the fiber bloom, thus destroying its smooth flow characteristics.

A previous attack on this problem has been to employ light absorbing additives in the plastic. However the resins themselves can absorb the radiation and degradation still occurs.

Plastic articles other than piping systems are also often desirably protected from light for various reasons. Many approaches have been tried, including employing reflective finishes as well as light absorbing additives. But these approaches have disadvantages when utilized in piping systems, where the physical and chemical properties of the plastic pipe must be such as to withstand conditions not found in other uses of plastic articles. In piping systems, the glass reinforced resin structure should retain its advantageous properties of durability, surface smoothness, and chemical integrity.

For instance, reflective layers may have different coefficients of expansion than the other layers, in which case expansions and contractions due to temperature pressure variations could cause delamination of the pipe structure. Reflective finishes could also experience the same difficulty with expansion and contraction. The problem in glass reinforced plastic pipe is to provide lasting protection from resin degrading without impairing the other physical properties of the pipe, and in obtaining a chemical system which may be processed to build durable, light reflective plastic pipe.

SUMMARY OF THE INVENTION

The invention is directed to the solution of the above problems and has other advantages which will be apparent from the drawings and description.

The invention protects glass reinforced resin articles from resin degradation and fiber bloom by reflecting ultraviolet radiation from the exposed surfaces of the article. To provide this property, a metal powder of fine mesh is dispersed throughout the resin system of the pipe or alternately, is dispersed throughout the outer portion of the resin system of the pipe.

Having particular applicability to glass reinforced, thermosetting resin pipe, the invention contemplates a metal powder, thermosetting resin, and glass fiber composition which reflects ultraviolet radiation but retains all of the desirable chemical and physical qualities for piping systems. The metal powder is dispersed within the resin and does not detract appreciably from the durability and chemical integrity of the glass reinforced resin. The smooth finish of the piping system is also retained in this manner of construction. A further feature is that the addition of the metal powder in the composition of the resin does not complicate the usual pipe fabricating process.

The figures illustrate the best embodiments presently contemplated by the inventor.

Figure 2:
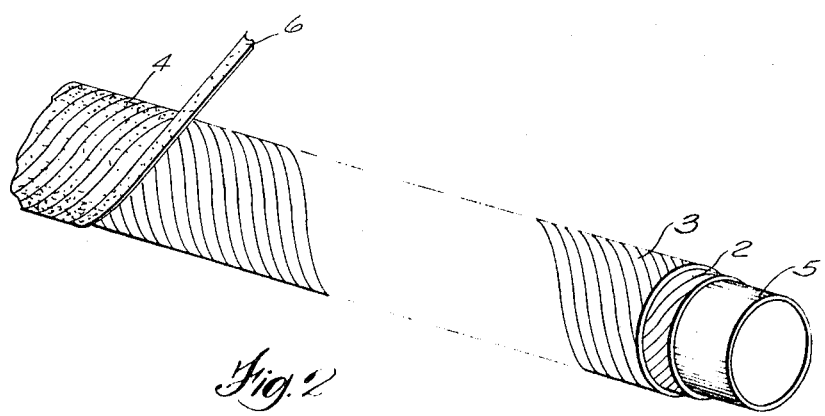

In the drawings:

FIG. 1 is a cross section of a pipe section fabricated by the method of the invention; and FIG. 2 is a perspective view of a pipe section being fabricated on a mandrel.

DESCRIPTION

FIG. 1 illustrates a pipe having a cylindrical wall 1 comprised of a plurality of superimposed layers including an inner layer 2, an intermediate layer 3 and an outer layer 4. While the drawings show the pipe section formed of three layers, it is contemplated that the wall 1 can be formed of any desired number of layers depending on the ultimate use of the pipe section and physical properties desired. Each layer is comprised of a thermosetting resin impregnated with glass fiber reinforcement and the resin system of the outer layer 4 has a metal powder dispersed therein to provide a reflective outer layer. The powder may be any light reflective metal or alloy such as aluminum, brass, zinc, magnesium or other reflective materials which can be ground to fine mesh particle size and be mixed with the thermosetting resin. The powder must also be chemically and physically compatible with the particular resin used in the pipe, such as to retain the desirable properties of the pipe.

The invention contemplates further that the powder chosen should be amenable to dispersion in the uncured resin system, for ease in fabricating the pipe section. To illustrate this feature, FIG. 2 shows an example of a pipe fabricating process wherein a glass fiber, resin impregnated tape is wound on mandrel 5 to provide the layers 2, 3 and 4. Layers 2 and 3 are shown already wound on the mandrel in a helical pattern and layer 4 is being applied by winding tape 6 over the other layers.

The tape is preferably formed of substantially continuous glass strands, but fibrous glass matting, woven glass fabric, braided tubing, or the like can also be used.

The tape for each layer can be prepared by passing the tape through a solution consisting of a resin and a curing agent or hardener dissolved in a volatile solvent. The glass picks up portions of the solution and is then passed through a heat zone to evaporate the solvent, and then through a cold zone to retard any reaction of the curing agent and resin. Resulting from this process is a tape comprised of glass fiber impregnated with the resin system.

The tape is preferably applied to a heated mandrel 5. The resin system will soften and flow when wrapped on the hot mandrel to thus merge the windings into an integral structure. Curing is then done in a well known fashion to provide a durable, smooth finished plastic pipe.

The resin may be any thermosetting plastic desired, such as epoxy, vinyl ester, polyester or the like. More particularly, the epoxy resin or glycidyl polyethers which are employed to impregnate the fibrous material are conventional types which may be prepared by condensing a polyhydric phenol with a polyepoxide or polyfunctional halohydrin, as disclosed, for example, in U.S. Pat. No. 2,801,227 entitled "Process for Manufacture of Glycidyl Ethers of Polyhydric Phenols." The glycidyl polyethers are generally prepared by heating the range of 50° to 150° C. and using one or two or more mols. of the halohydrin per mol. of the polyhydric phenol. An alkaline material, such as sodium or potassium hydroxide, is used in a stoichiometric excess of about 2 to 5 percent to the halohydrin. The heating is continued for several hours to effect the reaction and the product is then washed free of salt and base. The product is not a single simple compound but is generally a complex mixture of glycidyl polyethers and the principal product may be represented by the formula

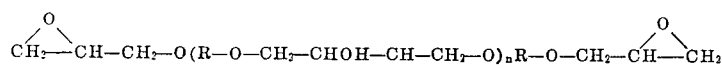

when $n$ is an integer of the series 0, 1, 2, 3 ... and R represents the polyvalent hydrocarbon radical of the polyhydric phenol.

The glycidyl polyethers used in the invention have an epoxy equivalency greater than 2. By the epoxy equivalency is meant the average number of epoxy groups contained in the average molecule of the glycidyl ether.

The curing agents used to cure the epoxy resin to its infusible, rigid state may take the form of 4,4' methylene dianiline, ethylene diamine, metaphenylene diamine, triethylene triamine, diamino diphenyl sulfone, acid anhydrides such as phthalic, dodecenyl, succinic and chlorendic anhydrides and the like.

Polyester resins may be employed in which at least one of the reactants contains an unsaturated double bond in an aliphatic group. The unsaturated bond may be in the polybasic acid component such as when malsic acid or anhydride is reacted with a polyhydric alcohol such as glycerol, ethylene glycol, diethylene glycol, propylene glycol, sorbitol, manitol, polyethylene glycol and the like.

In preparing the tape 6 which is wound to provide layer 4 the metal powder is mixed in the resin system. This is done by adding the powder into the solvent solution of resin and curing agent. Aluminum pigment particles in the range of 200–300 mesh can be added to the solvent solution in amounts varying from about 0.5 to 25 percent, and preferably 0.5 to 20 percent, based on the weight of the resin solids. The upper limit of the powder concentration is usually determined by the precess of manufacture. Difficulties in impregnating the glass may be experienced if the solution contains too high a percentage of powder. An adequate ultraviolet reflective layer for most situations is provided by a 4 percent by weight concentration of powder in the solution used to impregnate the tape 6. With these concentrations, the pipe structure retains its durable and smooth properties.

There are other methods for manufacturing glass reinforced plastic pipe. Where vinyl ester, polyester or many epoxy resins are used, it is preferred to pull glass through a solution of curing agent dissolved in the resin. The epoxy resins have already been described and the vinyl ester or polyester resins may be any of the conventional thermosetting resins.

After pulling the glass through the resin-curing agent solution, the impregnated glass is wound directly on the mandrel and cured as described in the first example. In this method, the powder is mixed with the resin-curing agent solution, or in as much of it as will be impregnated on the glass comprising the reflective layers. The concentration by weight of aluminum powder in this system can be as high as 20 to 40 percent, with particular resin systems.

Other methods of glass reinforced plastic pipe manufacturing, such as by extrusion, spin casting or hand lay-up are sometimes used. The invention can be advantageously employed with such systems by appropriate modification in adding the powder to the resin system.

If desired, more than one layer of the pipe wall 1 can have metal powder mixed with the resin, to thus increase the reflective capability of the pipe.

The invention thus provides protection from ultraviolet degradation of exposed thermosetting resin, glass reinforced articles. This is accomplished without deleterious effects on the physical properties of the article.

The embodiment described is an illustrative example The following claims clearly define the scope of the invention.

I claim:

1. A plastic article comprised of superimposed layers of glass fiber impregnated with a thermosetting resin, and ultraviolet reflective metallic particles dispersed in at least an outer layer of the article, said metallic particles capable of being mixed with said thermosetting resin when the resin is in the uncured state.

2. The article of claim 1, wherein the metallic particles are of aluminum pigment having a particle size in the range of 200 to 300 mesh.

3. The article of claim 1, wherein the superimposed layers are formed of resin impregnated glass fiber tape.

4. The article of claim 1, wherein the metallic particles are of a metal powder comprising from 0.5 to 20 percent by weight of the resin.

* * * * *